3,282,756
METHOD FOR REPRODUCING PRECISION
SCALES FROM A MASTER BY ETCHING
John B. Hawley, Jr., Wayzata, Minn., assignor to Northern Pump Company, Minneapolis, Minn., a corporation of Minnesota
Filed Jan. 23, 1964, Ser. No. 339,707
4 Claims. (Cl. 156—13)

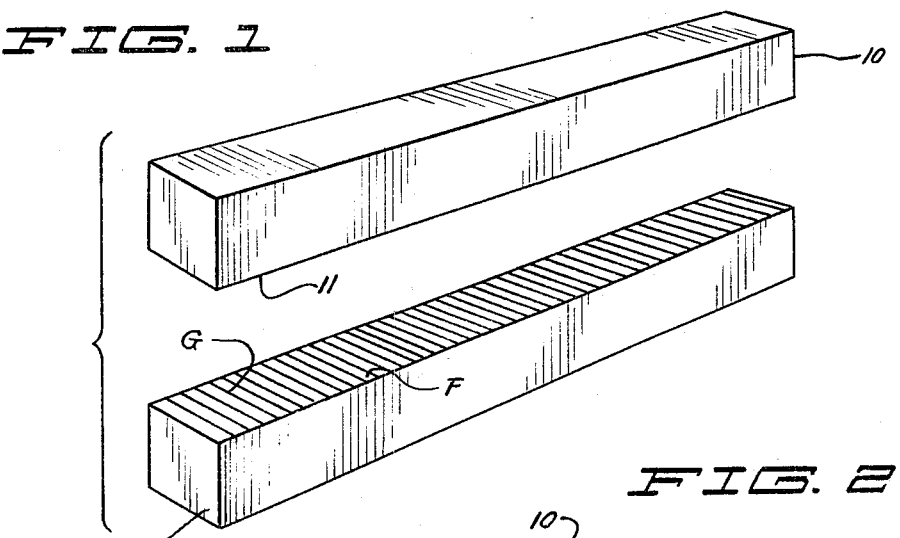
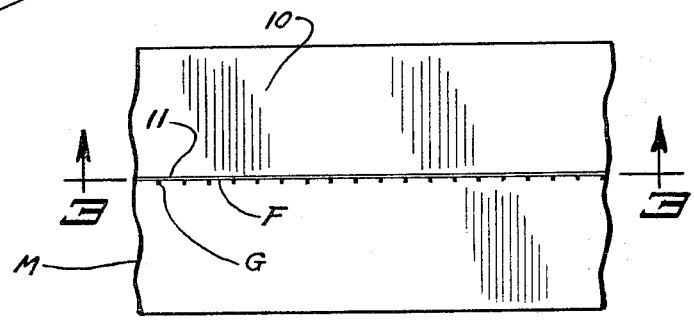
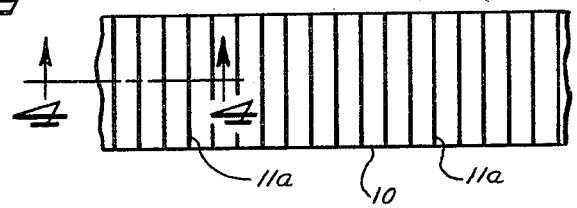
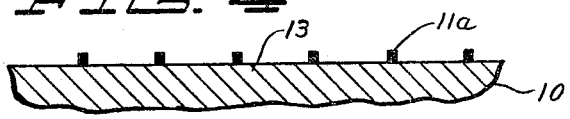
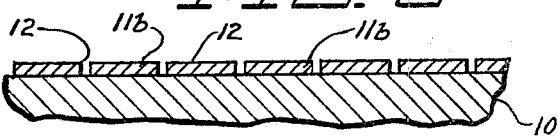
INVENTOR.
JOHN B. HAWLEY JR.
BY John W. Adams
ATTORNEY

United States Patent Office 3,282,756
Patented Nov. 1, 1966

This invention relates generally to the reproduction of scales and more particularly to the process of reproducing scales from a master scale using a radioactive substance as the transfer medium.

It has long been a problem to produce scales from a master scale which are not only accurate but inexpensive to manufacture. The manufacturer has usually had at his disposal a master scale which is used only for the reproduction of other scales therefrom and which is safeguarded against accidental injury which would impair the accuracy of the scale. Up to this time many methods have been used to transfer or reproduce the marking indicia of a master scale to material to be used for other measuring scales but most of these have been either particularly expensive and time consuming or have resulted in inferior products. In the mechanical reproduction of a scale from a master scale the line transfer consists of some method of scribing lines and it is usually necessary to optically compare the result against the master scale to insure accuracy. This added comparison time, of course, results in a very expensive operation. Methods have also been used in which a master scale is photographed and the photograph reproduced on the material to be used for the new scale and some etching process continued from this point to produce the scale. This method although accurate, required a great amount of work and extraneous preparation in obtaining a suitable photograph before the scale is finally produced therefrom.

Applicant, however, has provided a means for reproducing a standard scale upon which the measuring indicia is transferred while being in direct contact with the master scale and, therefore, will eliminate inaccuracies due to mechanical defects or other defects inherent in any system. In this method applicant has provided a radioactive source to be placed in the incised graduations of a master scale and has provided a sensitized photosensitive resist surface upon the material from which the standard scale is to be produced and the two elements are brought into face-to-face contact such that the photosensitive resist material is exposed by the radioactive material in the graduations of the master scale. After the first such exposure the scale to be reproduced may then be reversed end for end with respect to the master scale and re-exposed to insure accuracy. (The reversal technique being used only when the master scale is linearly symmetrical.) The photo-resist material is then developed and the scale is then treated by various methods to produce either a negative or positive of the master scale.

It is a further object of this invention to provide a radioactive exposure means for cooperative association with the graduations on the surface of a master scale for exposing a photosensitive resist surface of material upon which the scale is to be reproduced such that photosensitive resist material will be exposed by the radioactive material while the same are held in face-to-face contact.

It is a further object of this invention to provide means for developing and treating an exposed photosensitive resist surface such that the exposed portions of the photosensitive resist material may be converted into either raised or incised marking indicia on a block of scale material such that the marking indicia will be positioned in direct relation to the exposed photosensitive resist material.

It is a further object of this invention to provide means for reproducing standard scales which are produced by face-to-face contact with a master scale and in which no mechanical devices are necessary thus eliminating any mechanical inaccuracies.

These and other objects and advantages of this invention will more fully appear from the following description made in connection with the accompanying drawings, wherein like reference characters refer to the same or similar parts throughout the views, and in which:

FIG. 1 is a perspective view showing the master scale and the bar of scale material upon which the master scale is to be reproduced;

FIG. 2 is a side elevation showing the master scale and the scale material in face-to-face contact;

FIG. 3 is a horizontal section taken substantially along line 3—3 of FIG. 2 showing the exposed photosensitive resist material;

FIG. 4 is a vertical section taken substantially along line 4—4 of FIG. 3 showing the photosensitive resist material after developing and drawn to an enlarged scale;

FIG. 5 is substantially the same view as in FIG. 4 with an additional plating thereon;

FIG. 6 is a view the same as FIG. 5 showing the finished scale after removal of the photosensitive resist material with portions of the plating thereon defining the incised graduations; and FIG. 7 shows a completed scale produced by this method wherein the incised graduations are defined by the scale material.

As shown in the accompanying drawings to reproduce standard scales from a master scale; the master scale designated M with incised graduations designated G; a face-to-face transfer method is employed. To accomplish this the incised graduations G of the master scale M are filled with a radioactive material by a process which includes dispersing the radioactive material in a pigmented medium such as lacquer, epoxy resin or wax and applying the same to the scale surface. The surface of the scale M must be carefully coated so that a minimum of radio-active material appears on the flats F between the graduations G and employing a pigmented medium greatly facilitates this requirement.

Through experimentation it has been found that the source is preferably a pure beta ray emitting substance. Carbon 14 as barium or sodium carbonate would be examples particularly recommended as well as prometheum 147 as a salt. Iodine 125 and 129 are also acceptable even though a certain amount of gamma radiation is attendant in their use.

The bar from which a scale is to be reproduced, generally designated 10 is smoothly coated on the side upon which the scale will be cut with a photosensitive resist material designated 11. A general classification of the photoresist material used would be "bichromated glue coatings" and the more conventional materials are basically ammonium bichromate and gelatin or glue. A commercially available and acceptable material is Eastman Kodak's Metal-Etch Resist (MER).

As shown in FIG. 2 the photosensitive surface 11 of the scale material 10 is then placed in face-to-face contact with the radioactivated surface of the master scale M and exposed thereby due to the action of the beta rays upon the photosensitive material.

The radioactive substance contained in the graduations G of the master scale M serves as a concentrated energy source to expose the photosensitive resist material 11 directly thereover but will not expose any other portion of the photosensitive material. This is a result of the close face-to-face contact which does not allow the beta rays to project in broadcast fashion but rather the photosensitive material 11 is exposed as a line of no substantially greater width than the width of the graduations G containing the radioactive medium.

As shown in FIG. 3 the photosensitive surface 11 will now consist of a plurality of exposed areas 11a which correspond to the incised graduations G on the master scale M, and a plurality of unexposed areas 11c therebetween corresponding to the unradiated flats F of the master scale M.

The resist material 11 is now developed in the usual manner well known to those skilled in the art and the product resulting therefrom is illustrated in FIG. 4 which illustrates the developed resist material 11a as embossed lines and the portion of the resist material that was not exposed completely removed leaving voids extending to the scale material surface 13.

At this point in the procedure various courses may be followed to produce several types of scales. Three methods will be described and it will be understood that the principal portion of the invention has been in the exposure of the photosensitive resist surface by the radio-active substance with the variations that are described hereinafter showing methods for producing the completed product.

As illustrated in FIGS. 5 and 6 one method includes plating the now developed scale surface such as by chrome plating or the like resulting in a metallic coating 12 completely over the developed resist material 11a and the scale material surface 13.

The next step is to remove the developed resist material 11a with a suitable organic solvent such as trichlorethylene, acetone or the like. As shown in FIG. 6, the photosensitive resist material will be removed by the solvent resulting in incised graduations 11b between the unaffected metallic coating 12. These voids 11b correspond to the incised graduations G of the master scale M and for clarity of resolution may be deepened by etching with nitric acid into the scale material 10.

To produce a scale such as shown in FIG. 7 in which the incised graduations, designated 16 in this case, are defined by the scale material 10 and lie below the scale material surface 15, changes are required in the production procedure. That is to say after developing the exposed resist material to the state as shown in FIG. 4 a new course is followed. In this case the voids between the embossed resist material 11a are filled with an etch resist material such as lacquer, wax, fish glue, albumen or the like. The embossed resist portions 11a are then removed by etching which is allowed to continue below the surface 15 of the scale material 10 using an etch solution such as ferric chloride inhibited nitric acid which upon completion and removal of the etch resistant material results in a scale 10 having incised graduations 16 as shown in FIG. 7.

In a third method the scale material having the embossed resist portions 11a as shown in FIG. 5 may be used as a master scale from which additional scales may be produced. This method would require filling the voids between the embossed resist portions 11a with radioactive material and exposing a third bar which has been coated with photosensitive resist material. After exposure and development a plurality of embossed resist material areas corresponding to the flats F of the master scale M would remain thereon and etching the voids existing therebetween would produce the desired scribe line directly.

Although various other etching or scribing methods may be employed which will produce scales that are either negative or positive from the master scale M it should be obvious that the important aspect of the invention is the radioactive exposure of the photosensitive resist material.

To insure accuracy in the original radioactive exposure an additional step may be incorporated provided the master scale is linearly symmetrical. After the initial exposure the scale material 10 having the resist surface 11 would be turned end for end and again placed into face-to-face contact with the master radioactivated scale. In this manner should the centerline of the graduation G of the master scale M be out of nominal position by no greater than the width of the graduation the reexposure would result in an image of the graduation that is slightly wider but perfectly accurate with respect to position of its centerline.

It should be obvious that applicant has provided a method of producing standard scales from a master scale which not only results in an accurate scale but is also simple to use in that no mechanical transfer of measurements is employed.

It should be understood that various changes may be made in the form, details, arrangements and proportion of parts without departing from the scope of this invention, which generally stated consists in the matter set forth in the appended claims.

What I claim is:

1. A process for producing standard scales from a master scale consisting in the following steps:
    (a) applying a radioactive emission material to the graduations of a master scale;
    (b) providing material from which a scale is to be produced and coating at least one surface thereof with a photosensitive resist material;
    (c) exposing said resist material by placing the same in face-to-face contact with said radioactive emitting material;
    (d) developing said photosensitive resist material to produce a plurality of raised resist material lines on the scale material and thereafter,
    (e) etching the scale material to produce a standard scale with graduations located thereon in corresponding location to the graduations of the master scale.

2. The structure set forth in claim 1 wherein said radioactive emission includes beta rays.

3. The structure set forth in claim 1 wherein said radioactive emitting material is dispersed in a pigmented medium to facilitate application to the master scale.

4. The process of producing standard scales from a master scale consisting in the following steps:
    (a) dispersing a beta ray emitting material in a pigmented medium;
    (b) applying the prepared medium to the graduations of a master scale;
    (c) preparing material from which a scale is to be produced by coating at least one surface thereof with a photosensitive resist material;
    (d) exposing said photosensitive material by placing the same into face-to-face contact with the ray emitting graduations of the master scale;
    (e) developing the exposed resist material to produce a plurality of raised resist material lines on the scale material; and
    (f) processing the scale material to produce graduations thereon in corresponding position to the raised resist material lines.

No references cited.

ALEXANDER WYMAN, *Primary Examiner.*

J. STEINBERG, *Assistant Examiner.*